United States Patent
Ueda (10) Patent No.: US 12,009,131 B2
(45) Date of Patent: Jun. 11, 2024

(54) COIL DEVICE

(71) Applicant: IHI Corporation, Tokyo (JP)

(72) Inventor: Akio Ueda, Tokyo (JP)

(73) Assignee: IHI CORPORATION, Tokyo (JP)

( * ) Notice: Subject to any disclaimer, the term of this patent is extended or adjusted under 35 U.S.C. 154(b) by 911 days.

(21) Appl. No.: 16/970,504

(22) PCT Filed: Nov. 5, 2018

(86) PCT No.: PCT/JP2018/041012
§ 371 (c)(1),
(2) Date: Aug. 17, 2020

(87) PCT Pub. No.: WO2019/163208
PCT Pub. Date: Aug. 29, 2019

(65) Prior Publication Data
US 2020/0381164 A1    Dec. 3, 2020

(30) Foreign Application Priority Data

Feb. 23, 2018  (JP) .................. 2018-030500

(51) Int. Cl.
*H01F 27/10*   (2006.01)
*H01F 27/36*   (2006.01)
*H02J 50/10*   (2016.01)

(52) U.S. Cl.
CPC ........... *H01F 27/10* (2013.01); *H01F 27/363* (2020.08); *H02J 50/10* (2016.02)

(58) Field of Classification Search
CPC .... H01F 27/10; H01F 27/363; H01F 27/2871; H01F 5/00; H01F 27/025; H01F 27/12; H01F 27/2876; H01F 27/18; H01F 38/14; H01F 27/08; H01F 27/105; H01F 27/125; H01F 27/14; H01F 27/16; H02J 50/10; H02J 50/005; H02J 50/12; Y02T 10/70;
(Continued)

(56) References Cited

U.S. PATENT DOCUMENTS 3,448,219 A * 6/1969 Nakazawa ............. H01F 27/14
                                                                174/12 R
4,173,746 A * 11/1979 Stubblefield .......... H01F 27/322
                                                                336/57
(Continued)

FOREIGN PATENT DOCUMENTS

CN        107051460 A  *  8/2017  ............ B01J 23/745
DE    102011077427 A1    12/2012
(Continued)

OTHER PUBLICATIONS

Wikibooks, "School Science/Hydraulics demonstration", http://en.wikibooks.org/wiki/School_Science/Hydraulics_demonstration, published/last-edited on Jul. 20, 2009, retrieved on Jun. 26, 2023. (Year: 2009).*

*Primary Examiner* — Shawki S Ismail
*Assistant Examiner* — Matthew T Sarles
(74) *Attorney, Agent, or Firm* — Volpe Koenig (57) ABSTRACT

A coil device includes a coil part having a coil, a case accommodating the coil part, a coolant accommodated in the case, and a fluid volume adjusting part for supplying the coolant to the case or discharging the coolant from the case. The coil part floats on the coolant.

10 Claims, 5 Drawing Sheets

(58) Field of Classification Search
CPC ..... Y02T 10/7072; Y02T 90/12; Y02T 90/14; B60L 53/12; B60L 53/302
See application file for complete search history.

(56) References Cited

U.S. PATENT DOCUMENTS

| | | | | |
|---|---|---|---|---|
| 6,157,282 | A * | 12/2000 | Hopkinson | H01F 27/10 336/60 |
| 6,175,212 | B1 | 1/2001 | Oguri | |
| 9,660,478 | B2 * | 5/2017 | Von Novak | H02J 50/12 |
| 9,660,487 | B1 * | 5/2017 | Mu | H02J 50/10 |
| 2013/0039815 | A1 * | 2/2013 | Murata | H01F 27/02 422/129 |
| 2014/0091757 | A1 | 4/2014 | Proebstle et al. | |
| 2015/0224882 | A1 | 8/2015 | Brill et al. | |
| 2016/0005521 | A1 * | 1/2016 | Pal | H01F 27/2895 336/60 |
| 2016/0013664 | A1 | 1/2016 | Maekawa et al. | |
| 2017/0136897 | A1 * | 5/2017 | Ricci | B60L 53/126 |
| 2017/0237278 | A1 | 8/2017 | Zhang | |
| 2017/0368946 | A1 | 12/2017 | Kume et al. | |
| 2018/0254136 | A1 | 9/2018 | Ueda et al. | |
| 2019/0180908 | A1 * | 6/2019 | Metzler | H01F 27/10 |
| 2019/0337393 | A1 * | 11/2019 | Von Novak, III | B60L 53/38 |
| 2020/0278616 | A1 * | 9/2020 | Koolmees | F17C 13/087 |
| 2020/0398687 | A1 * | 12/2020 | Laemmle | H02J 50/005 |
| 2021/0104347 | A1 * | 4/2021 | Findeisen | H01F 27/12 |

FOREIGN PATENT DOCUMENTS

| | | |
|---|---|---|
| EP | 2996221 A1 | 3/2016 |
| JP | 06-113408 A | 4/1994 |
| JP | 2000-133537 A | 5/2000 |
| JP | 2006-041353 A | 2/2006 |
| JP | 2009-188076 A | 8/2009 |
| JP | 2012-216569 A | 11/2012 |
| JP | 2014-222975 A | 11/2014 |
| JP | 2016-025008 A | 2/2016 |
| JP | 2017-054886 A | 3/2017 |
| JP | 2017-524331 A | 8/2017 |
| JP | 2018-007297 A | 1/2018 |
| WO | 2014/029439 A1 | 2/2014 |

* cited by examiner

Fig.5

COIL DEVICE

TECHNICAL FIELD

The present disclosure relates to a coil device.

BACKGROUND ART

A coil device that includes a coil part is used, for example, in a wireless power supply system. In such a wireless power supply system, power is supplied from a power transmitting side coil device to a power receiving side coil device using magnetic coupling between coils, for example, as disclosed in Patent Literature 1. When power is supplied, the coil part is heated. The system disclosed in Patent Literature 1 uses a fan to cool the coil part to improve power supply efficiency.

CITATION LIST

Patent Literature

Patent Literature 1: Japanese Unexamined Patent Publication No. 2012-216569

SUMMARY OF INVENTION

Technical Problem

There is a need in this technical field to more efficiently cool coil parts. There is also a need to be able to change the coil characteristics of coil devices, for example, for improving power supply efficiency in wireless power supply systems.

The present disclosure thus describes a coil device that is capable of efficiently cooling a coil part and changing coil characteristics.

Solution to Problem

A coil device according to an embodiment of the present disclosure includes a coil part having a coil, a case accommodating the coil part, a coolant accommodated in the case, and a fluid volume adjusting part for supplying the coolant to the case or discharging the coolant from the case, wherein the coil part floats on the coolant.

Effects of Invention

An embodiment of the present disclosure is capable of efficiently cooling the coil part and changing coil characteristics.

DESCRIPTION OF EMBODIMENTS

A coil device according to an embodiment of the present disclosure includes a coil part having a coil, a case accommodating the coil part, a coolant accommodated in the case, and a fluid volume adjusting part for supplying the coolant to the case or discharging the coolant from the case, wherein the coil part floats on the coolant.

In this coil device, the heat generated at the coil part can be efficiently transmitted to the coolant since the coil part is in contact with the coolant. Moreover, the fluid volume adjusting part supplies or discharges the coolant to cause the coil part to be raised as the coolant increases or to cause the coil part to be lowered as the coolant decreases. The coil device is thus capable of changing the position of the coil part by supplying or discharging the coolant. In other words, the coil device is capable of changing the coil characteristics of the coil device simply by supplying or discharging the coolant. Consequently, the coil device is capable of efficiently cooling the coil part and changing the coil characteristics.

The coil device described above may further include a liquefaction pipe attached to an outer surface of the case, wherein one end of the liquefaction pipe may communicate with an interior space of the case and another end of the liquefaction pipe may be positioned higher than the one end of the liquefaction pipe. When the coolant boils due to the heat of the coil part, gas of the vaporized coolant enters the liquefaction pipe and is cooled back to liquid inside the liquefaction pipe. The coolant turned back into liquid is returned to the case through the liquefaction pipe due to the other end of the liquefaction pipe being positioned higher than the one end thereof. The coil device is thus capable of efficiently cooling the coil part by vaporizing the coolant. Moreover, the coil device is capable of preventing a decrease of the coolant since the coolant turned back into liquid can be returned to the case by the liquefaction pipe.

A coil device according to another embodiment of the present disclosure includes a coil part having a coil, a case accommodating the coil part, a coolant accommodated in the case, and a fluid volume adjusting part for supplying the coolant to the case or discharging the coolant from the case, wherein the coil part divides an interior space of the case into a first chamber and a second chamber and is movable inside the case along a direction of alignment of the first chamber and the second chamber, the coolant is accommodated in the first chamber, and the fluid volume adjusting part supplies the coolant to the first chamber or discharges the coolant from the first chamber.

In this coil device, the heat generated at the coil part can be efficiently transmitted to the coolant since the coil part is in contact with the coolant. Moreover, the fluid volume adjusting part supplies the coolant to the first chamber to cause pressure of the coolant inside the first chamber to rise, so that the coil part moves in a direction from the first chamber toward the second chamber by being pushed by the coolant. Furthermore, when the coil device is disposed such that the first chamber is below the second chamber, the fluid volume adjusting part discharges the coolant from the first chamber to cause the pressure of the coolant inside the first chamber to fall, so that the coil part moves in a direction from the second chamber toward the first chamber under its own weight. The coil device is thus capable of changing the position of the coil part by supplying or discharging the coolant. In other words, the coil device is capable of changing the coil characteristics of the coil device simply by supplying or discharging the coolant. Consequently, the coil device is capable of efficiently cooling the coil part and changing the coil characteristics.

The coil device described above may further include a packing attached to the coil part, wherein the packing may be sandwiched between an outer surface of the coil part and an inner surface of the case and abut the outer surface of the coil part and the inner surface of the case, and the interior space of the case may be divided into the first chamber and the second chamber by the coil part and the packing. In this case, the coil device is capable of efficiently moving the coil part by supplying or discharging the coolant.

The coil device may further include a shield plate that is disposed so as to face the coil part. In this case, the coil device is capable of changing the distance between the coil part and the shield plate by moving the coil part. The coil device is thus capable of changing the coil characteristics of the coil device by changing the distance between the coil part and the shield plate.

The coil device may further include a measurement part for measuring an electric current value flowing through the coil, wherein the fluid volume adjusting part may supply or discharge the coolant such that the electric current value measured by the measurement part is reduced. In this case, the coil device is capable of reducing the amount of heat generated at the coil. The coil device is thus capable of reducing the amount of heat generated at the coil and efficiently cooling the coil part.

The coil device may further include a regulating part for regulating movement of the coil part in a direction intersecting the direction of movement of the coil part when the coolant is supplied or discharged. In this case, the coil device is capable of preventing misalignment of the coil part by the regulating part.

Embodiments of the present disclosure will be described below with reference to the drawings. It should be noted that like elements are given like reference signs in the description of the drawings and redundant explanation is omitted.

First Embodiment

Figure 1:
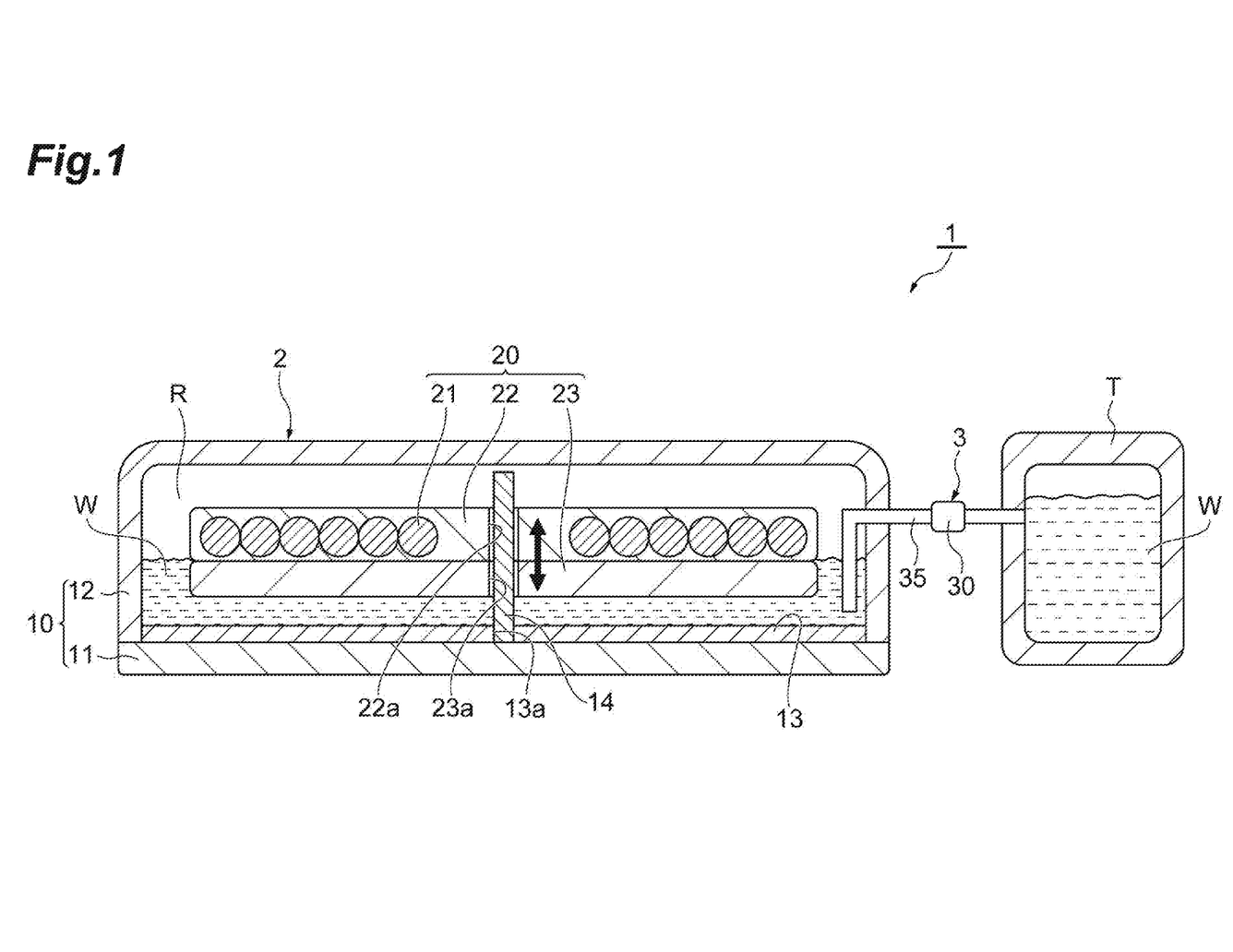
FIG. 1 A cross-sectional view showing a schematic configuration of a coil device according to a first embodiment.

A first embodiment will now be described. A coil device 1 shown in FIG. 1 is used, for example, as a power receiving device or a power transmitting device in a wireless power supply system. The wireless power supply system is, for example, a system for charging a battery installed in a vehicle, such as an electric vehicle or a hybrid vehicle. The coil device 1 may be used both as the power receiving device and the power transmitting device.

When the coil device 1 is used as the power transmitting device, the coil device 1 as a power transmitting coil device is installed, for example, on the ground, such as a road surface. The coil device 1 has an external power source connected thereto, for example, via a transmitting circuit and a rectifier circuit. When the coil device 1 is used as the power receiving device, the coil device 1 as a power receiving coil device is fixed, for example, to a chassis of a vehicle. The coil device 1 has a battery connected thereto, for example, via a receiving circuit and a charging circuit.

The power transmitting coil device and the power receiving coil device face each other in a vertical direction and inner coils thereof are electromagnetically coupled to form an electromagnetic coupling circuit, to thereby cause power to be wirelessly supplied from the coil of the power transmitting coil device to the coil of the power receiving coil device. That is, the power receiving coil device wirelessly receives electric power from the power transmitting coil device. The electromagnetic coupling circuit may be a circuit that supplies power by "electromagnetic induction" or a circuit that supplies power by "magnetic resonance."

Figure 2:
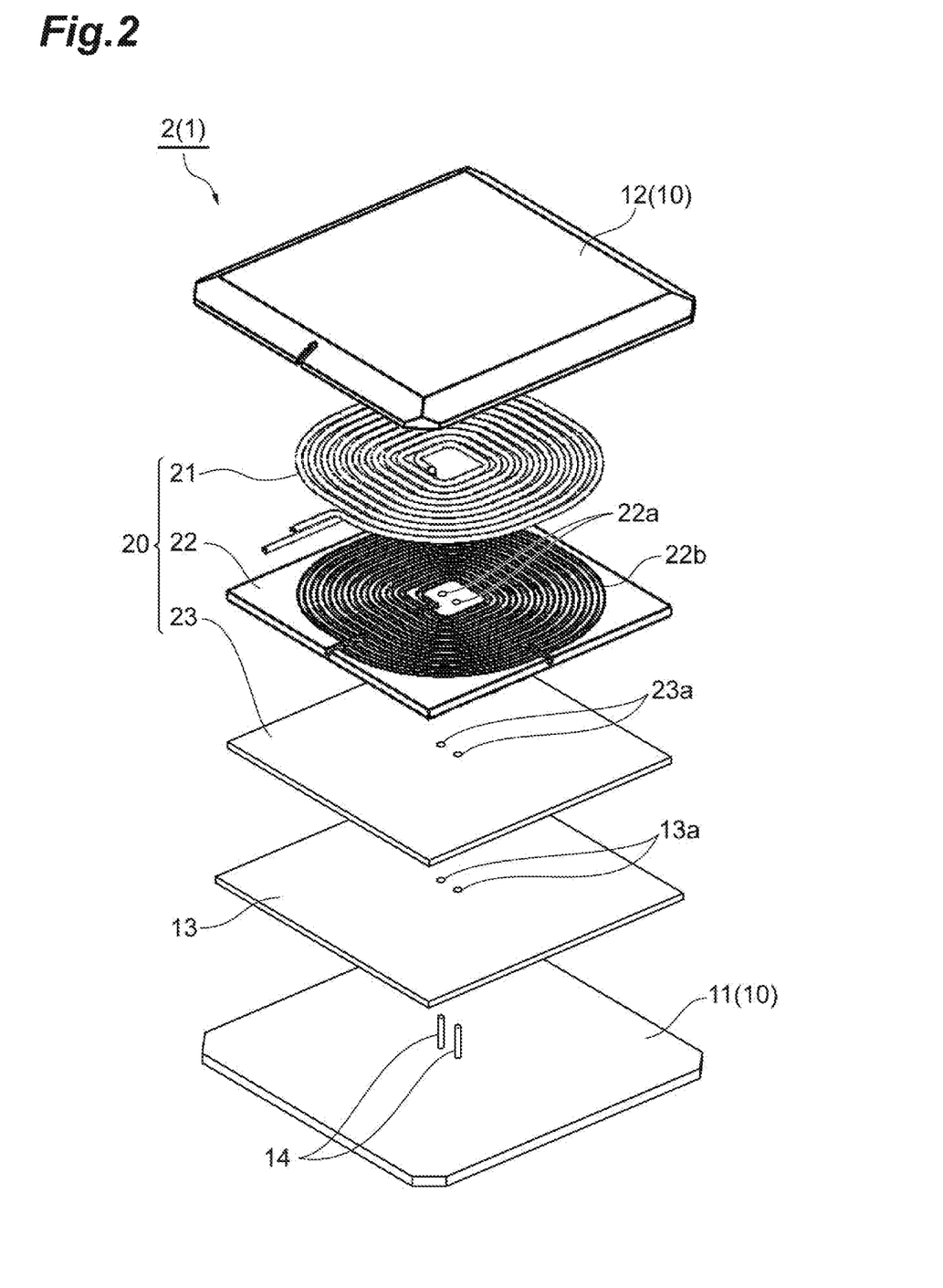
FIG. 2 An exploded perspective view showing a pad of FIG. 1.

The coil device 1 used as a power transmitting coil device in a wireless power supply system is described below as an example. As shown in FIGS. 1 and 2, the coil device 1 includes a pad 2 and a coolant supply system 3. The pad 2 is fixed to a road surface or the like.

Configuration of Pad

The pad 2 will now be described. The pad 2 is, for example, flat. The pad 2 includes a case 10, a shield plate 13, a positioning pin (regulating part) 14, a coil part 20, and a coolant W. The case 10 has a base 11 and a cover 12 that covers an upper surface of the base 11.

The base 11 is a plate-like member disposed on a rear surface side of the coil part 20. The cover 12 is a box body disposed on a front surface side of the coil part 20 and protects interior components including the coil part 20. The base 11 and the cover 12 are formed, for example, of engineering plastic or fiber-reinforced plastic (FRP). The base 11 and the cover 12 form an accommodating space (interior space) R that accommodates the coil part 20 and the like. The coil part 20, the shield plate 13, the positioning pin 14, and the coolant W are accommodated in the accommodating space R of the case 10. The case 10 is formed such that the coolant W does not leak outside. It should be noted that the coolant W is omitted in FIG. 2. The pad 2 is installed such that the base 11 is at the bottom.

The positioning pin 14 is attached to the upper surface of the base 11. The positioning pin 14 regulates movement of the coil part 20 in a direction intersecting a direction of movement of the coil part 20 when the coolant W is supplied or discharged. Specifically, the positioning pin 14 is a columnar member that extends upward from the upper surface of the base 11. In this embodiment, there are two positioning pins 14. As shown in FIG. 2, the two positioning pins 14 are formed in the vicinity of the center of the upper surface of the base 11 spaced apart by a predetermined distance.

The shield plate 13 is a plate-like member fixed to the upper surface of the base 11. The shield plate 13 is disposed so as to face a lower surface of the coil part 20. The shield plate 13 has magnetic shielding characteristics to block outflow of leakage flux. The shield plate 13 is formed, for example, of a material that has low permeability, such as aluminum. Two holes 13a having circular cross sections are formed in the vicinity of the center of the shield plate 13. The positioning pins 14 are passed through the holes 13a of the shield plate 13.

The coil part 20 is formed in a position above the shield plate 13. The coil part 20 includes a coil 21, a bobbin 22, and a ferrite core 23. The coil 21 is formed, for example, from a conductive wire wound in a substantially rectangular spiral within the same plane. The coil 21 generates magnetic flux. The coil 21 is, for example, a circular coil. For example, a litz wire in which a plurality of conductor strands insulated from each other are twisted together is used as the conductive wire that forms the coil 21. However, a copper or aluminum solid wire may also be used as the conductive wire that forms the coil 21. It should be noted that the coil 21 is not limited to a circular coil and may, for example, be a solenoid coil. Moreover, the coil part 20 may be an air core coil that does not have the ferrite core 23.

The bobbin 22 holds the coil 21. The bobbin 22 is a flat plate-like member that holds the conductive wire (coil 21) by the conductive wire being wound with respect to the bobbin 22. Grooves 22b are formed on the surface of the bobbin 22. The bobbin 22 holds the conductive wire by the conductive wire being disposed in the grooves 22b. The bobbin 22 is formed of a non-magnetic and non-electrically conductive material (e.g., silicone or polyphenylene sulfide resin). Two holes 22a having circular cross sections are formed in the vicinity of the center of the bobbin 22. The positioning pins 14 are passed through the holes 22a of the bobbin 22. The positioning pins 14 are formed in a portion where the conductive wire of the coil 21 does not pass over.

The ferrite core 23 is formed of ferrite, which is a magnetic material. The ferrite core 23 is, for example, a magnetic member that has high permeability. The ferrite core 23 is a plate-like member. The ferrite core 23 is responsible for directing the magnetic flux generated by the coil 21 and preventing the magnetic flux from spreading outside the space between the coil 21 and a coil facing the coil 21. Two holes 23a having circular cross sections are formed in the vicinity of the center of the ferrite core 23. The positioning pins 14 are passed through the holes 23a of the ferrite core 23.

The bobbin 22 that holds the coil 21 and the ferrite core 23 are fixed to each other. That is, the coil 21, the bobbin 22, and the ferrite core 23 are integral with one another. However, they may be integral by the bobbin 22 that holds the coil 21 and the ferrite core 23 being accommodated in a coil case or the like. The coil part 20 is disposed such that the ferrite core 23 faces the shield plate 13. That is, the coil 21 is positioned above the ferrite core 23. The coil 21 thus transmits power to the coil of a power receiving coil device positioned above the pad 2.

The coil part 20 is capable of moving in a vertical direction along a direction of extension of the positioning pins 14. The coil part 20 is a floating structure and floats on the coolant W in the case 10. In other words, at least a lower surface of the coil part 20 is in contact with the coolant W. A height position of the coil part 20 in the vertical direction is determined by the amount (fluid level) of the coolant W in the case 10.

It should be noted that FIG. 1 shows the ferrite core 23 being immersed in the coolant W and the coil 21 (bobbin 22) not immersed in the coolant W. However, the degree of immersion of the coil part 20 can be set, for example, by adjusting the magnitude of buoyant force acting on the coil part 20. For example, the buoyant force may be adjusted by a well-known method such as adjusting the size and weight of the coil part 20. The coil part 20 may be immersed in the coolant W up to the coil 21 by adjusting the magnitude of the buoyant force.

Heat generated at the coil part 20 is transmitted to the coolant W. That is, the coolant W cools the coil part 20 by removing the heat from the coil part 20. For example, water, oil (preferably insulating oil), or inactive coolants that have electric insulating properties are used as the coolant W. It should be noted that the accommodating space R of the case 10 in this embodiment is a sealed space. In this case, for example, a high boiling point type coolant that does not boil by the heat generated at the coil part 20 may be used as the coolant W.

Configuration of Coolant Supply System

Figure 3:
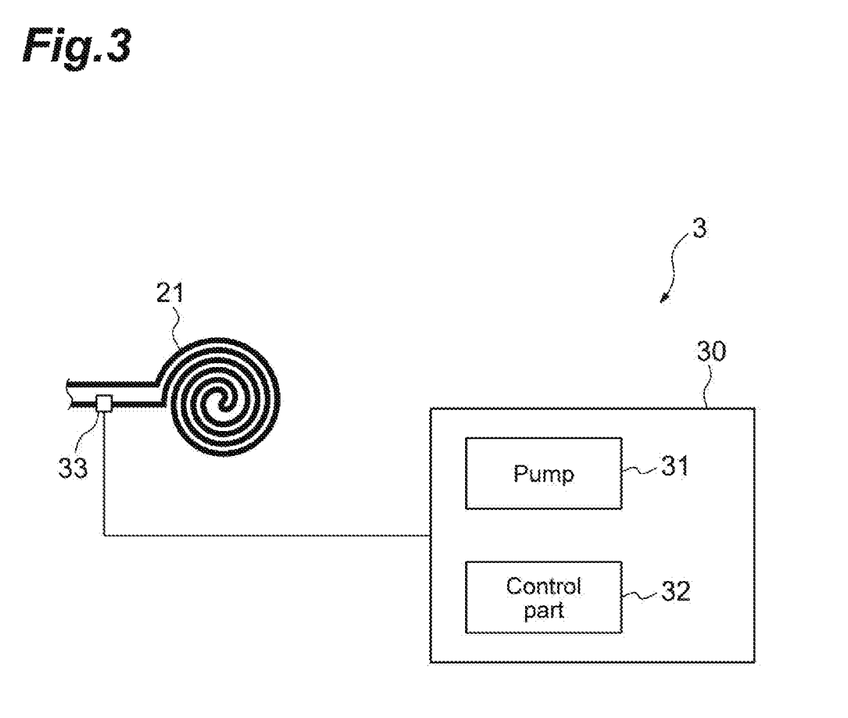
FIG. 3 A block diagram showing a configuration of a coolant supply system of FIG. 1.

The configuration of the coolant supply system 3 will next be described. As shown in FIGS. 1 and 3, the coolant supply system 3 adjusts the amount of the coolant W in the case 10. The coolant supply system 3 includes a pump unit (fluid volume adjusting part) 30 and an electric current sensor (measurement part) 33.

The electric current sensor 33 measures the electric current value that flows through the coil 21 when power is transmitted by the coil device 1. It should be noted that the position in which the electric current sensor 33 is disposed is not limited so long as the electric current value that flows through the coil 21 can be measured. The electric current sensor 33 measures the electric current value that flows through the coil 21 by a well-known method.

The pump unit 30 supplies the coolant W to the accommodating space R of the case 10. The pump unit 30 also discharges the coolant W from the accommodating space R of the case 10. The pump unit 30 is thus capable of adjusting the amount of the coolant W in the case 10. Specifically, as shown in FIG. 1, the pump unit 30 is formed on a pipe 35 that connects a tank T, in which the coolant W is stored, to the inside of the case 10.

The pump unit 30 includes a pump 31 and a control part 32. The pump 31 supplies the coolant W in the tank T to the case 10 through the pipe 35. The pump 31 also discharges the coolant W in the case 10 to the tank T through the pipe 35. Various pumps may be used as the pump 31 so long as they are capable of supplying and discharging the coolant W.

The control part 32 controls operation of the pump 31. The control part 32 supplies the coolant W to the case 10 or discharges the coolant W from the case 10 by the pump 31 such that the electric current value measured by the electric current sensor 33 is reduced when power is transmitted by the coil device 1. The control part 32 is, for example, an electronic control unit (controller) that has a processor, such as a central processing unit (CPU), and the like.

The coolant supply system 3 adjusts the amount of the coolant W in the case 10 to change the fluid level of the coolant W. The change in the fluid level of the coolant W changes the height position of the coil part 20 floating on the coolant W.

Thus, in the coil device 1 of this embodiment, the heat generated at the coil 21 and the ferrite core 23 when the coil device 1 transmits power can be efficiently transmitted to the coolant W since the coil part 20 is in contact with the coolant. Moreover, the coolant supply system 3 supplies the coolant W to the case 10 to cause the coil part 20 to be raised as the coolant W increases. Furthermore, the coolant supply system 3 discharges the coolant W from the case 10 to cause the coil part 20 to be lowered as the coolant W decreases. The coil device 1 is thus capable of changing the height position of the coil part 20 by supplying or discharging the coolant W. This enables the coil device 1 to change the distance between the coil part 20 and a power receiving coil when a power receiving coil device is disposed so as to face an upper surface of the pad 2. In other words, the coil device 1 is capable of changing coil characteristics of the coil device 1 simply by supplying or discharging the coolant W. Consequently, the coil device 1 is capable of efficiently cooling the coil part 20 and changing the coil characteristics.

The coil device 1 includes the shield plate 13 that is disposed in a position facing the lower surface of the coil part 20. The shield plate 13 is fixed to the base 11. In this case, the coil device 1 is capable of changing the distance between the coil part 20 and the shield plate 13 by moving the coil part 20. The coil device 1 is thus capable of changing the coil characteristics of the coil device 1 by changing the distance between the coil part 20 and the shield plate 13. Moreover, the coil device 1 is capable of blocking the outflow of leakage flux by having the shield plate 13.

The pump unit 30 supplies or discharges the coolant W such that the electric current value that flows through the coil 21 is reduced. In this case, the coil device 1 is capable of reducing the amount of heat generated at the coil 21. The coil device 1 is thus capable of reducing the amount of heat generated at the coil 21 and efficiently cooling the coil part 20.

The positioning pins 14 extend along the vertical direction, that is, the direction of movement of the coil part 20 when the coolant W is supplied or discharged. The positioning pins 14 are passed through the holes 22a and 23a formed in the coil part 20 such that the coil part 20 is movable along the direction of extension of the positioning pins 14. The coil device 1 is thus capable of regulating the movement of the coil part 20 in the direction intersecting the direction of movement of the coil part 20 (vertical direction) by the positioning pins 14. Here, the coil device 1 regulates the movement of the coil part 20 in a horizontal direction as the direction intersecting the direction of movement of the coil part 20 (vertical direction). Moreover, there are two positioning pins 14 in this embodiment. The two positioning pins 14 are spaced apart by a predetermined distance. The coil device 1 is thus capable of regulating rotation of the coil part 20 about an axis along the vertical direction by the two positioning pins 14.

Variation of First Embodiment

Figure 4:
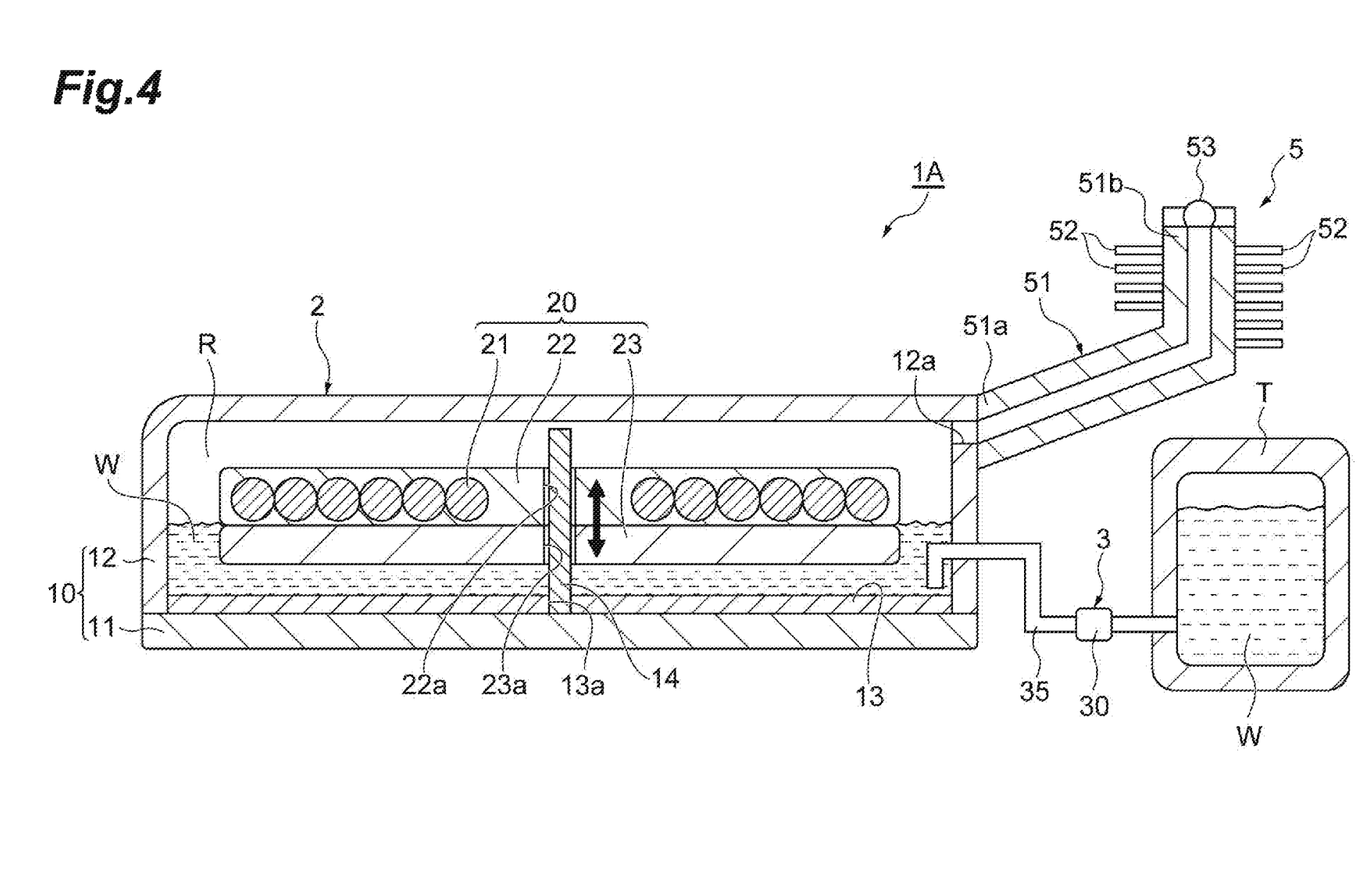
FIG. 4 A cross-sectional view showing a schematic configuration of a variation of the coil device according to the first embodiment.

A variation of the first embodiment will next be described. In the description of this variation, elements similar to those of the coil device 1 of the first embodiment are given the same reference signs and detailed explanation is omitted. As shown in FIG. 4, a coil device 1A according to the variation has a cooling pipe unit 5 added to the coil device 1 of the first embodiment. The coil device 1A includes the pad 2, the coolant supply system 3, and the cooling pipe unit 5.

The cooling pipe unit 5 includes a liquefaction pipe 51, fins 52, and a relief valve 53. The liquefaction pipe 51 is attached to an outer surface of the cover 12 of the case 10. The liquefaction pipe 51 has one end 51a that is in communication with the accommodating space R of the case 10 through a hole 12a formed in the cover 12. The liquefaction pipe 51 has another end 51b that is positioned higher than the one end 51a. The liquefaction pipe 51 is formed, for example, of a material that has good thermal conductivity, such as metal.

It should be noted that the one end 51a of the liquefaction pipe 51 is in communication with the accommodating space R at a position above the fluid level of the coolant W. That is, the hole 12a of the cover 12 is formed at a position above the fluid level of the coolant W. The liquefaction pipe 51 is thus capable of leading gas of the vaporized coolant W into the liquefaction pipe 51 when the coolant W boils.

The fins 52 are attached to an outer surface of the liquefaction pipe 51. A plurality of the fins 52 are formed. The fins 52 are formed, for example, of a material that has good thermal conductivity, such as metal.

The relief valve 53 is attached to the other end 51b of the liquefaction pipe 51. The relief valve 53 releases the gas inside the case 10 to the outside when pressure inside the liquefaction pipe 51, that is, inside the case 10 is equal to or greater than a predetermined pressure.

In this variation, a low boiling point type coolant that boils by the heat generated at the coil part 20 is used as the coolant W.

As described above, in the coil device 1A of this variation, when the coolant W boils by the heat generated at the coil part 20, the gas of the vaporized coolant W enters the liquefaction pipe 51. The gas that enters the liquefaction pipe 51 exchanges heat with outside air via the liquefaction pipe 51 and the fins 52. That is, the gas of the vaporized coolant W is cooled back to liquid inside the liquefaction pipe 51. The coolant W turned back into liquid is returned to the case 10 through the liquefaction pipe 51 due to the other end 51b of the liquefaction pipe 51 being positioned higher than the one end 51a thereof. The coil device 1A is thus capable of efficiently cooling the coil part 20 by vaporizing the coolant W. Moreover, the coil device 1A is capable of preventing a decrease of the coolant W since the coolant W turned back into liquid can be returned to the case 10 by the liquefaction pipe 51.

The cooling pipe unit 5 is capable of efficiently cooling the gas of the vaporized coolant W by having the fins 52 formed on the liquefaction pipe 51. Moreover, the coil device 1A is capable of preventing the pressure inside the case 10 from being equal to or greater than a preset pressure by having the relief valve 53 formed on the liquefaction pipe 51.

Second Embodiment

A second embodiment will next be described. In the description of this embodiment, elements similar to those of the coil device 1 of the first embodiment are given the same reference signs and detailed explanation is omitted. Similarly to the first embodiment, a coil device of the second embodiment used as a power transmitting coil device in a wireless power supply system is explained below as an example.

Figure 5:
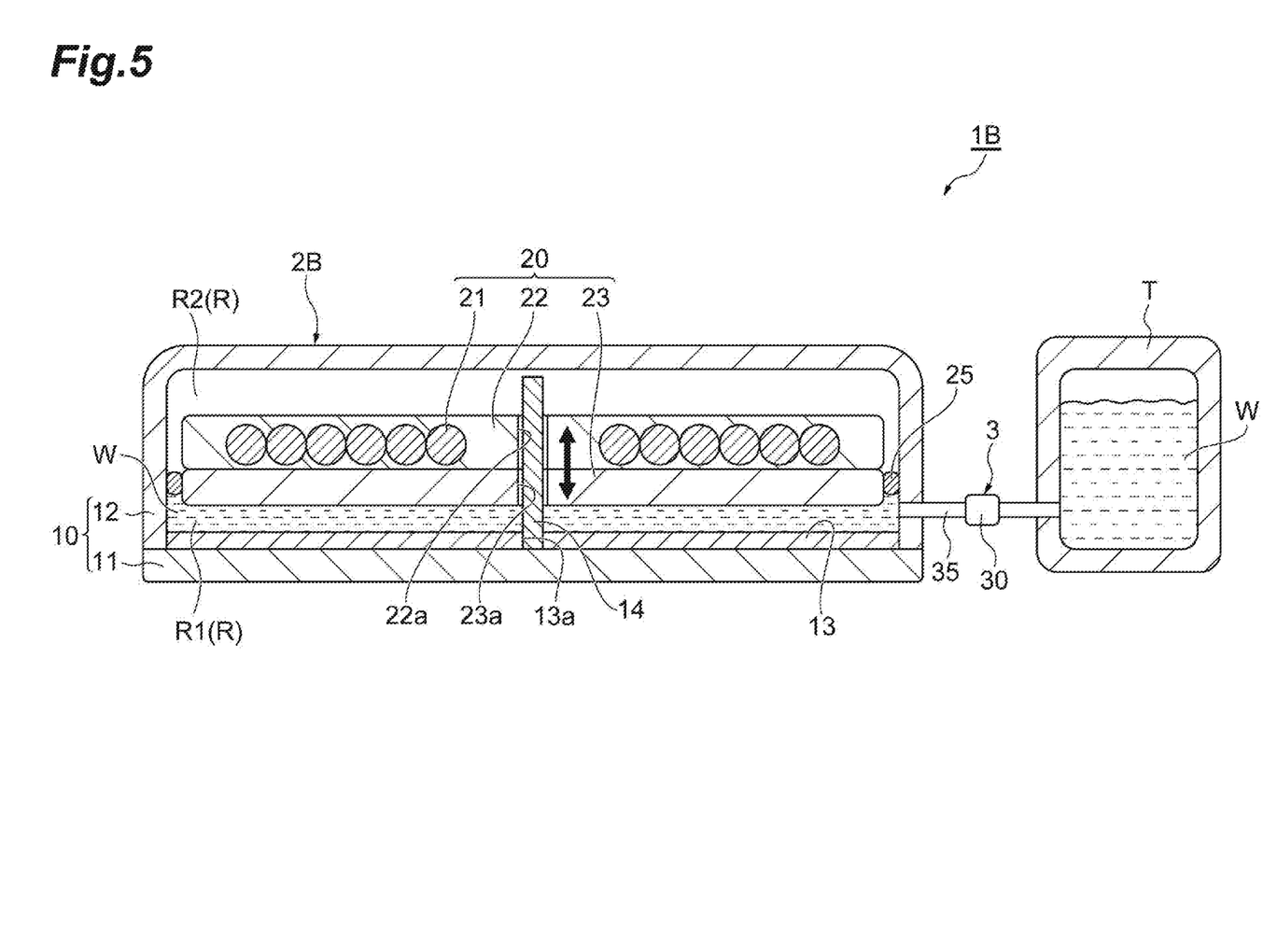
FIG. 5 A cross-sectional view showing a schematic configuration of the coil device according to a second embodiment.

As shown in FIG. 5, a coil device 1B includes a pad 2B and the coolant supply system 3. The pad 2B is fixed to a road surface or the like.

Configuration of Pad

The pad 2B further includes a packing 25 compared to the pad 2 of the first embodiment. In the coil part 20, the accommodating space R of the case 10 is divided into a first chamber R1 and a second chamber R2. Here, in the accommodating space R of the case 10, the space below the coil part 20 is the first chamber R1 and the space above the coil part 20 is the second chamber R2. The coil part 20 is movable inside the case 10 along a direction of alignment of the first chamber R1 and the second chamber R2. That is, the coil part 20 is movable inside the case 10 along the positioning pins 14 that extend along the vertical direction.

In this embodiment, the packing 25 is attached to a side surface (outer surface facing sideways) of the coil part 20. The packing 25 is formed, for example, of a material having elasticity, such as rubber. The packing 25 is formed circumferentially around the entire perimeter of the side surface of the coil part 20. The packing 25 is sandwiched between the side surface of the coil part 20 and an inner surface of the case 10 and abuts the side surface of the packing 25 and the inner surface of the case 10. Moreover, the packing 25 abuts the inner surface of the case 10 so as to be slidable relative to the inner surface of the case 10 in the vertical direction.

The accommodating space R of the case 10 is thus divided into the first chamber R1 and the second chamber R2 by the coil part 20 and the packing 25. The coolant W is accommodated in the first chamber R1. In this embodiment, the first chamber R1 is filled with the coolant W. Leakage of the coolant W from the first chamber R1 to the second chamber R2 through gaps between the side surface of the coil part 20 and the inner surface of the case 10 is prevented by having the packing 25 formed between the side surface of the coil part 20 and the inner surface of the case 10.

It should be noted that, although the packing 25 is attached to a side surface of the ferrite core 23 of the coil part 20 in FIG. 5, the packing 25 may be attached to a side surface of the bobbin 22. The degree of immersion of the coil part 20 in the coolant W is set by the position at which the packing 25 is attached.

The coolant supply system 3 adjusts the amount of the coolant W in the first chamber R1 in the case 10. The configuration of the coolant supply system 3 is the same as the coolant supply system 3 of the first embodiment described using FIGS. 1 and 3.

Thus, in the coil device 1B of this embodiment, the heat generated at the coil part 20 can be efficiently transmitted to the coolant W since the coil part 20 is in contact with the coolant W. Moreover, the coolant supply system 3 supplies the coolant W to the first chamber R1 to cause pressure of the coolant W inside the first chamber R1 to rise, so that the coil part 20 moves in a direction from the first chamber R1 toward the second chamber R2 (i.e., upward) by being pushed by the coolant W. Furthermore, in this embodiment, the pad 2B is disposed such that the first chamber R1 is below the second chamber R2. In this case, the coolant supply system 3 discharges the coolant W from the first chamber R1 to cause the pressure of the coolant W inside the first chamber R1 to fall, so that the coil part 20 moves in a direction from the second chamber R2 toward the first chamber R1 (i.e., downward) under its own weight. The coil device 1B is thus capable of changing the height position of the coil part 20 by supplying or discharging the coolant W. This enables the coil device 1B to change the distance between the coil part 20 and a power receiving coil when a power receiving coil device is disposed so as to face an upper surface of the pad 2B. In other words, the coil device 1B is capable of changing the coil characteristics of the coil device 1B simply by supplying or discharging the coolant W. Consequently, the coil device 1B is capable of efficiently cooling the coil part 20 and changing the coil characteristics.

The coil device 1B includes the packing 25 that is attached to the coil part 20. This prevents leakage of the coolant W from the first chamber R1 to the second chamber R2 through gaps between the side surface of the coil part 20 and the inner surface of the case 10. The coil device 1B is thus capable of efficiently moving the coil part 20 by supplying or discharging the coolant W.

The coil device 1B includes the shield plate 13 that is disposed in a position facing the lower surface of the coil part 20. The coil device 1B is thus capable of changing the coil characteristics of the coil device 1B by changing the distance between the coil part 20 and the shield plate 13, similarly to the coil device 1 of the first embodiment. Moreover, the coil device 1B is capable of blocking the outflow of leakage flux by having the shield plate 13.

The pump unit 30 supplies or discharges the coolant W such that the electric current value that flows through the coil 21 is reduced. In this case, the coil device 1B is capable of reducing the amount of heat generated at the coil 21, similarly to the coil device 1 of the first embodiment. The coil device 1B is thus capable of reducing the amount of heat generated at the coil 21 and efficiently cooling the coil part 20.

The coil device 1B includes the positioning pins 14. The coil device 1B is thus capable of regulating the movement of the coil part 20 in the direction intersecting the direction of movement of the coil part 20 (vertical direction) by the positioning pins 14, similarly to the coil device 1 of the first embodiment. The coil device 1B is also capable of regulating the rotation of the coil part 20 about an axis along the vertical direction by the two positioning pins 14.

Although the embodiments of the present disclosure have been described above, the present disclosure is not limited there to. For example, although the shield plate 13 is disposed inside the case 10, it may be disposed outside the case 10. Alternatively, the base 11 may also function as the shield plate 13. It is not essential for the shield plate 13 to be installed.

The coolant supply system 3 is not limited to both supplying and discharging the coolant W to and from the case 10. For example, the coolant supply system 3 may have a configuration that includes only one of supplying and discharging the coolant W to and from the case 10. The coil devices 1, 1A, and 1B are also capable of changing the coil characteristics in this case, since the coolant supply system 3 is capable of moving the coil part 20.

The coolant supply system 3 is not limited to operating the pump 31 on the basis of the measurement results from the electric current sensor 33. For example, the coolant supply system 3 may operate the pump 31 on the basis of an instruction from an operator or the like.

Although there are two positioning pins 14 in the above embodiments and variation, there may be only one positioning pin 14, or there may be three or more positioning pins 14. Moreover, the positioning pins 14 may have shapes other than columnar shapes.

A circuit such as a transmitting circuit and/or a rectifier circuit may be accommodated inside the case 10 in the above embodiments and variation. The circuit such as a transmitting circuit may also be immersed in the coolant W. In this case, the circuit such as a transmitting circuit can also be cooled by the coolant W.

Although in the above embodiments and variation, the coil devices 1, 1A, and 1B used as a power transmitting coil device of a wireless power supply apparatus are described as examples, they may be used as a power receiving coil device installed in a vehicle. In this case, the pads 2 and 2B are fixed to a chassis or the like of the vehicle with the base 11 facing upward. For example, in the pad 2B of the second embodiment, when the base 11 is facing upward, the space below the coil part 20 is the first chamber R1 and the space above the coil part 20 is the second chamber R2 in the accommodating space R of the case 10. The coolant W is accommodated in the first chamber R1 that is positioned on a lower side in the accommodating space R divided into the first chamber R1 and the second chamber R2.

Although in the wireless power supply systems described above, power is transmitted from a ground side to a vehicle side, power may be transmitted from the vehicle side to the ground side. In this case, the power receiving coil device is installed on the ground, such as a road surface and the power transmitting coil device is installed in the vehicle.

The coil device 1, etc., described above may be applied to wireless power transfer systems for charging batteries of movable objects other than vehicles, such as underwater vessels. The coil device 1, etc., described above may also be applied to systems that directly supply electric power to components that consume electric power, such as motors or sensors. The coil device 1, etc., described above may also be applied to induction heating systems or eddy current flaw detection systems.

INDUSTRIAL APPLICABILITY

A coil device of the present disclosure is capable of efficiently cooling a coil part and changing coil characteristics.

REFERENCE SIGNS LIST 1, 1A, 1B Coil device
10 Case
13 Shield plate
14 Positioning pin (Regulating part)
20 Coil part
21 Coil
25 Packing
30 Pump unit (Fluid volume adjusting part)
33 Electric current sensor (Measurement part)
51 Liquefaction pipe
51a One end of liquefaction pipe
51b Other end of liquefaction pipe
R Accommodating space (Interior space)
R1 First chamber
R2 Second chamber
W Coolant

The invention claimed is:

1. A coil device comprising:
a coil part having a coil;
a case accommodating the coil part;
a coolant accommodated in the case; and
a fluid volume adjusting part for supplying the coolant to the case or discharging the coolant from the case,
wherein the coil part floats in the coolant within the case, and
wherein the coil part moves in a vertical direction so that a space between a lower surface of a top plate of the case and an upper surface of the coil part changes according to a change in a liquid level of the coolant.

2. The coil device according to claim 1, further comprising a liquefaction pipe attached to an outer surface of the case, wherein one end of the liquefaction pipe communicates with an interior space of the case and another end of the liquefaction pipe is positioned higher than the one end of the liquefaction pipe.

3. The coil device according to claim 1, further comprising a shield plate disposed so as to face the coil part.

4. The coil device according to claim 1, further comprising a regulating part for regulating movement of the coil part in a direction intersecting a direction of movement of the coil part when the coolant is supplied or discharged.

5. A coil device comprising:
a coil part having a coil;
a case accommodating the coil part;
a coolant accommodated in the case; and
a fluid volume adjusting part for supplying the coolant to the case or discharging the coolant from the case,
wherein the coil part divides an interior space of the case into a first chamber and a second chamber and is movable inside the case along a direction of alignment of the first chamber and the second chamber,
the coolant is accommodated in the first chamber, and
the fluid volume adjusting part supplies the coolant to the first chamber or discharges the coolant from the first chamber.

6. The coil device according to claim 5, further comprising a packing attached to the coil part, wherein the packing is sandwiched between an outer surface of the coil part and an inner surface of the case and abuts the outer surface of the coil part and the inner surface of the case, and the interior space of the case is divided into the first chamber and the second chamber by the coil part and the packing.

7. The coil device according to claim 5, further comprising a shield plate disposed so as to face the coil part.

8. The coil device according to claim 5, further comprising a measurement part for measuring an electric current value flowing through the coil, wherein the fluid volume adjusting part supplies or discharges the coolant such that the electric current value measured by the measurement part is reduced.

9. The coil device according to claim 5, further comprising a regulating part for regulating movement of the coil part in a direction intersecting a direction of movement of the coil part when the coolant is supplied or discharged.

10. A coil device comprising:
a coil part having a coil;
a case accommodating the coil part;
a coolant accommodated in the case;
a fluid volume adjusting part for supplying the coolant to the case or discharging the coolant from the case; and
a measurement part for measuring an electric current value flowing through the coil,
wherein the coil part floats on the coolant, and
wherein the fluid volume adjusting part supplies or discharges the coolant such that the electric current value measured by the measurement part is reduced.

* * * * *